(12) United States Patent
Jüngst et al.

(10) Patent No.: US 8,431,105 B2
(45) Date of Patent: Apr. 30, 2013

(54) METHOD FOR PRODUCING PROCESS GAS FOR THE CLAUS PROCESS

(75) Inventors: Eckhard Jüngst, Frankfurt a.M. (DE); Wolfgang Nehb, Frankfurt a.M. (DE); Alexander Schriefl, Frankfurt a.M. (DE)

(73) Assignee: Lurgi GmbH, Frankfurt am Main (DE)

( * ) Notice: Subject to any disclaimer, the term of this patent is extended or adjusted under 35 U.S.C. 154(b) by 0 days.

(21) Appl. No.: 13/265,023

(22) PCT Filed: Apr. 14, 2010

(86) PCT No.: PCT/DE2010/000421
§ 371 (c)(1),
(2), (4) Date: Nov. 18, 2011

(87) PCT Pub. No.: WO2010/124671
PCT Pub. Date: Nov. 4, 2010

(65) Prior Publication Data
US 2012/0085973 A1    Apr. 12, 2012

(30) Foreign Application Priority Data
Apr. 28, 2009 (DE) .......................... 10 2009 018 911

(51) Int. Cl.
*C01B 17/16* (2006.01)
*C01B 17/48* (2006.01)
*C01B 17/52* (2006.01)
*F23C 99/00* (2006.01)

(52) U.S. Cl.
USPC ................ 423/539; 423/542; 431/2; 431/356

(58) Field of Classification Search ................... 423/539, 423/542; 431/2, 356
See application file for complete search history.

(56) References Cited

U.S. PATENT DOCUMENTS

| 4,933,163 | A | 6/1990 | Fischer |
| 7,311,891 | B2 * | 12/2007 | Dolan et al. ............... 423/573.1 |
| 2002/0031468 | A1 | 3/2002 | Gross et al. |

FOREIGN PATENT DOCUMENTS

| DE | 34 30 015 C1 | 5/1986 |
| DE | 37 35 002 | 4/1987 |
| DE | 197 18 261 | 11/1998 |
| EP | 0 315 225 A1 | 5/1989 |
| EP | 0 701 967 A1 | 3/1996 |
| WO | 98/49098 A1 | 11/1998 |

OTHER PUBLICATIONS

"Leading Burner Designs for Sulfur Plants", Sulphur, British Sulphur Publishing, London, No. 224, pp. 23-34, Jan. 1, 1003, publication year 1993.
International Search Report Dated Aug. 23, 2010.
English Translation of International Search Report Dated Aug. 23, 2010.

* cited by examiner

*Primary Examiner* — Timothy Vanoy
(74) *Attorney, Agent, or Firm* — Norris McLaughlin & Marcus PA

(57) ABSTRACT

With a method configured to generate process gas that contains hydrogen sulfide and sulfur dioxide for the Claus process, hydrogen-sulfide containing feed gas is burned with pure oxygen by means of several burners opening out into a combustion chamber wherein the pure oxygen is fed into the combustion chamber through a central tube each, the feed gas through a tube arranged coaxially around the central tube and inert gas as purge gas via an annular duct coaxially surrounding the feed gas tube. A favorable option of the method consists in the use of $CO_2$ reclaimed by desorption of laden methanol as purge gas.

4 Claims, 1 Drawing Sheet

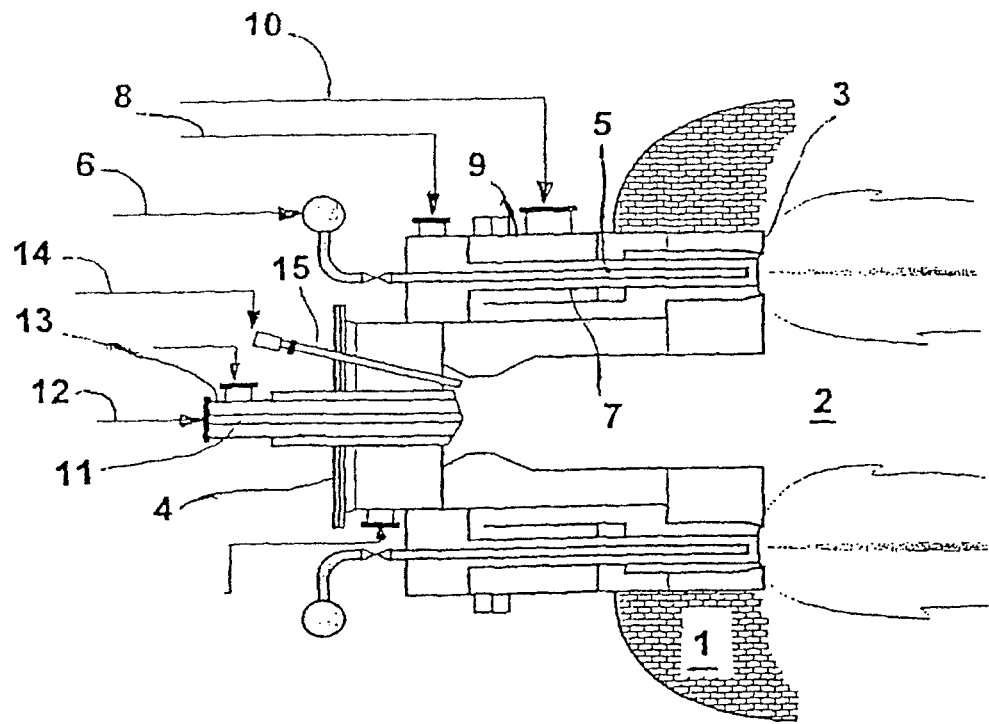

METHOD FOR PRODUCING PROCESS GAS FOR THE CLAUS PROCESS

This is a 371 of PCT/EP2010/000421 filed 14 Apr. 2010 (international filing date), claiming priority of German application 10 2009 018 911.4 filed 28 Apr. 2009.

The invention relates to a method for producing process gas containing hydrogen sulfide and sulfur dioxide for the Claus process, starting from feed gas that contains hydrogen sulfide which is burnt with pure oxygen at temperatures in the range of 800 to 1650° C. by means of several burners opening out into a combustion chamber where through one central tube each the pure oxygen is routed into the combustion chamber whilst the feed gas enters it through a tube arranged coaxially around the central tube and purge gas is added through an annular duct coaxially surrounding the feed gas tube and where in an auxiliary firing space connected to the combustion chamber and arranged at a distance to the burners, water vapor is fed through the central tube, heating gas through a tube coaxially surrounding the central tube, and sour water stripping gas is supplied through an external tube arranged coaxially around the heating gas tube, the combustion gases arising from the auxiliary firing space being conducted to the combustion chamber.

BACKGROUND OF THE INVENTION

A device for burning hydrogen-sulfide containing gas to produce process gas that contains hydrogen sulfide and sulfur dioxide for the Claus process is known from DE 34 30 015 C1, comprising a combustion chamber for generating the process gas at temperatures of 1000 to 1300° C., with tubes supplying air and hydrogen sulfide containing gas to the combustion chamber and with auxiliary firing in an auxiliary firing space merging into the combustion chamber, wherein the combustion gases of the auxiliary firing system are routed to the combustion chamber and the auxiliary firing system is provided with supply lines for hydrocarbon-rich heating gas, water vapor and air. At least one burner opens out into the combustion chamber, such burner being equipped with a central tube for oxygen supply, this central tube being coaxially surrounded by a second tube for supplying the feed gas that contains the hydrogen sulfide, and with an annular duct being arranged coaxially around the second tube for routing combustion air into the combustion chamber. This device enables feed gases with heavily fluctuating contents of hydrogen sulfide and heavily fluctuating feed gas rates to be processed. At extremely low hydrogen sulfide content, combustion takes place with pure oxygen, at extremely high hydrogen sulfur content, with air and under normal conditions, with air and oxygen.

In the Claus process, the feed gas containing the hydrogen sulfide is initially converted to a mixture of hydrogen sulfide and sulfur dioxide by partial combustion with the objective of adjusting a molar ratio of the two components of 2:1. The gas mixture thus obtained is converted to elemental sulfur and water in a catalytic Claus plant, and the offgas is fed to a desulfurizing facility. The offgas of the desulfurizing unit is typically modified to sulfur dioxide in a thermal post-combustion system so that an offgas forms which, however, only contains a small amount of sulfur dioxide.

In order to be able to process hydrogen-sulfide feed gas which also contains hydrocarbons and carbon dioxide, it is suggested pursuant to EP 0 315 225 B1 to feed the burner with gas which contains hydrogen sulfide as well as hydrocarbons or carbon dioxide, generating a temperature of 2000 to 3000° C. in the core zone of the burner flame and where a gas mixture of carbon monoxide and hydrogen is discharged from the combustion chamber at a temperature of up to 1650° C. Due to the high temperatures prevailing in the burner flame, most of the carbon dioxide contained in the feed gas is split into carbon monoxide and oxygen; water is partly decomposed to hydrogen and oxygen. In this way, part of the oxygen needed to maintain the high temperatures required in the flame zone of the burner and in the combustion chamber is made available so that the total oxygen demand can be kept low. The hydrogen existent in the product gas mixture of the combustion chamber is valuable for the downstream treatment of the gas mixture because hydrogenating reactions are thus viable without the addition of external hydrogen. Moreover, the gas components, hydrogen and carbon monoxide, can be used as synthesis gas.

When burning a feed gas stream containing hydrogen sulfide with pure oxygen exclusively, the outer annular duct is continuously purged with a small amount of air in order to prevent combustion gases leaving the combustion chamber from flowing back through the annular duct.

The mission of the present invention is to control the process described first in such a way that in the case of feed gas that contains hydrogen sulfide which can exclusively be burnt with pure oxygen, the supply of air via the external annular duct into the combustion chamber can be omitted.

The mission of the present invention is accomplished by purging the external annular duct with inert gas, preferably carbon dioxide, in order to suppress the reflux of combustion gases from the combustion chamber so that the combustion takes place with pure $O_2$ (>90%) exclusively.

A beneficial aspect is that the carbon dioxide accumulating in gas scavenging processes, particularly the carbon dioxide obtained by desorption of laden methanol, can be used as purge gas.

An appropriate device for implementing the method features the arrangement of the burners in one or more circles surrounding the auxiliary firing space.

SUMMARY OF THE INVENTION

The method according to the present invention is explained in detail below, based on an embodiment example in conjunction with the longitudinal section through the burner area of the combustion chamber, as illustrated in the drawing:

DETAILED DESCRIPTION

Brief Description of the Drawing

FIG. 1 illustrates the device of the invention

The refractory lining (1) of the combustion chamber (2) accommodates a burner system comprising two burners (3) and an auxiliary firing system (4) arranged between these at equal distance from each of the burners (3). Pure oxygen is supplied through line (6) to the central tube (5) arranged axially in each burner (3). Each of the central tubes (5) is surrounded by a coaxially arranged tube (7) thus forming an annular space to which feed gas that contains hydrogen sulfide is supplied through line (8). The feed gas tubes (7) are embraced by a coaxial annular duct (9) to which carbon dioxide as purge gas is fed through lines (10). The axially arranged central tube (11) of the auxiliary firing system (4) is supplied with steam through line (12) and with heating gas via the annular space existing between this central tube (11) and the tube (13) which surrounds the central tube coaxially. Via line (14), the ignition flame (15) is supplied with fuel gas. For

EXAMPLE

A total of 143 kmol/h oxygen are introduced into the central tubes (5) of the two burners (3) at a temperature of 40° C. and a pressure of 2.4 bar[a]. The annular space existent between the central tubes (5) and the coaxially arranged tubes (7) surrounding them is supplied with a total of 855 kmol/h feed gas that contains 35.1 mol % hydrogen sulfide and 63.1 mol % carbon dioxide as well as 0.6 mol % carbonyl sulfide, 0.6 mol % carbon monoxide and 0.5 mol % hydrogen at a temperature of 25° C. and a pressure of 1.65 bar[a]. The annular ducts (9) coaxially surrounding tubes (7) are fed with a total of 137 kmol/h carbon dioxide. 1118 kmol/h gas, at a temperature of 904° C. and a pressure of 1.58 bar[a], leave through the outlet of the combustion chamber (2). The analysis of this gas is as follows:

- 4.2 mol % $H_2S$
- 1.4 mol % $SO_2$
- 26.3 mol % $H_2O$
- 0.6 mol % COS
- 0.1 mol % $CS_2$
- 1.7 mol % CO
- 64.3 mol % $CO_2$
- 0.5 mol % $H_2$ ($S_x$=elemental sulfur).

The invention claimed is:

1. A method for producing process gas containing hydrogen sulfide and sulfur dioxide for the Claus process, starting from feed gas that contains hydrogen sulfide which is burned with pure oxygen at temperatures in the range of 800 to 1650° C. by means of several burners opening out into a combustion chamber where through one central tube each the pure oxygen is routed into the combustion chamber while the feed gas enters it through a tube arranged coaxially around the central tube and purge gas is added through an annular duct coaxially surrounding the feed gas tube and where in an auxiliary firing space connected to the combustion chamber and arranged at a distance from the burners, water vapor is fed through the central tube, heating gas through a tube coaxially surrounding the central tube, and sour water stripping gas is supplied through an external tube arranged coaxially around the heating gas tube, the combustion gases arising from the auxiliary firing space being conducted to the combustion chamber, said method comprising the use of inert gas as purge gas.

2. The method of claim 1, wherein $CO_2$ is used as purge gas.

3. The method of claim 2, wherein $CO_2$ accumulating in gas scavenging systems is used as purge gas.

4. The method of claim 3, wherein $CO_2$ reclaimed by desorption of laden methanol is used as purge gas.

* * * * *